US010831934B2

(12) United States Patent
Zimmer et al.

(10) Patent No.: US 10,831,934 B2
(45) Date of Patent: *Nov. 10, 2020

(54) MANAGEMENT OF AUTHENTICATED VARIABLES

(71) Applicant: Intel Corporation, Santa Clara, CA (US)

(72) Inventors: Vincent J. Zimmer, Federal Way, WA (US); Nicholas J. Adams, Beaverton, OR (US); Giri P. Mudusuru, Portland, OR (US); Lee G. Rosenbaum, Hillsboro, OR (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/709,047

(22) Filed: Sep. 19, 2017

(65) Prior Publication Data

US 2018/0025183 A1    Jan. 25, 2018

Related U.S. Application Data

(63) Continuation of application No. 14/317,909, filed on Jun. 27, 2014, now Pat. No. 9,785,801.

(51) Int. Cl.
*G06F 21/57*    (2013.01)
*G06F 21/72*    (2013.01)
(Continued)

(52) U.S. Cl.
CPC ........... *G06F 21/72* (2013.01); *G06F 21/575* (2013.01); *G09C 1/00* (2013.01); *H04L 9/3234* (2013.01);
(Continued)

(58) Field of Classification Search
CPC .......... G06F 21/51; G06F 21/57; G06F 21/72; G06F 21/575; H04L 9/3234
See application file for complete search history.

(56) References Cited

U.S. PATENT DOCUMENTS

2001/0001155 A1* 5/2001 Smith, Sr. ............... G06F 21/72
713/170
2002/0152355 A1* 10/2002 Otterness .............. G06F 3/0617
711/114
(Continued)

FOREIGN PATENT DOCUMENTS

CN    102063593 A    5/2011
EP    1975836 A2    10/2008
TW    201401097    1/2014

OTHER PUBLICATIONS

Tan et al., A TPM-enabled remote attestation protocol (TRAP) in wireless sensor networks, PM2HW2N '11 Proceedings of the 6th ACM workshop [online], Oct. 2011, [retrieved on Sep. 13, 2019]. Retrieved from the Internet < https:// dl.acm. org/ citation. cfm?id = 2069090 >. (Year: 2011).*

(Continued)

Primary Examiner — Malcolm Cribbs
(74) Attorney, Agent, or Firm — Trop, Pruner & Hu, P.C.

(57) ABSTRACT

An embodiment includes an apparatus comprising: an out-of-band cryptoprocessor coupled to secure non-volatile storage; and at least one storage medium having firmware instructions stored thereon for causing, during runtime and after an operating system for the apparatus has booted, the cryptoprocessor to (a) store a key within the secure non-volatile storage, (b) sign an object with the key, while the key is within the cryptoprocessor, to produce a signature, and (c) verify the signature. Other embodiments are described herein.

20 Claims, 5 Drawing Sheets

(51) Int. Cl.
*G09C 1/00* (2006.01)
*H04L 9/32* (2006.01)
(52) U.S. Cl.
CPC .... *G06F 2221/034* (2013.01); *H04L 2209/12* (2013.01)

(56) References Cited

U.S. PATENT DOCUMENTS

| | | | |
|---|---|---|---|
| 2004/0078483 A1* | 4/2004 | Simila | H04L 12/4641 709/238 |
| 2005/0132182 A1* | 6/2005 | Challener | G06F 21/57 713/150 |
| 2006/0142900 A1* | 6/2006 | Rothman | H04L 12/2803 700/295 |
| 2009/0006859 A1 | 1/2009 | Zimmer | |
| 2009/0172328 A1* | 7/2009 | Sahita | G06F 12/1491 711/163 |
| 2009/0327741 A1 | 12/2009 | Zimmer | |
| 2010/0070800 A1* | 3/2010 | Hanna | G06F 21/575 714/6.12 |
| 2010/0169633 A1 | 7/2010 | Zimmer et al. | |
| 2011/0093693 A1* | 4/2011 | Ibrahim | G06F 21/57 713/2 |
| 2012/0167205 A1 | 6/2012 | Ghetie | |
| 2012/0297043 A1* | 11/2012 | Davis | H04L 45/60 709/223 |
| 2013/0067210 A1 | 3/2013 | Nelson | |
| 2013/0067245 A1 | 3/2013 | Horovitz et al. | |
| 2013/0159704 A1* | 6/2013 | Chandrasekaran | G06F 21/57 713/156 |
| 2014/0003675 A1 | 1/2014 | Li et al. | |
| 2014/0040605 A1 | 2/2014 | Futral | |
| 2014/0380031 A1* | 12/2014 | Jones | G06F 21/572 713/2 |
| 2015/0095633 A1* | 4/2015 | Yao | G06F 21/575 713/2 |

OTHER PUBLICATIONS

European Patent Office, Supplementary European Search Report dated Feb. 20, 2018, in European Patent Application No. 15812809.0, six pages.
Thomas Rossow, "TPM 2.0, UEFI and their Impact on Security and Users' Freedom," Aug. 2013, 56 pages, Fachhochschule Hannover University of Applied Sciences and Arts, Germany.
International Searching Authority, "Notification of Transmittal of the International Search Report and the Written Opinion of the International Searching Authority," dated Sep. 25, 2015; in International application No. PCT/US2015/037600.
International Preliminary Report on Patentability issued in corresponding PCT application No. PCT/US2015/037600 dated Jan. 5, 2017.
Taiwan Intellectual Property Office, Office Action dated May 11, 2016 in Taiwan Patent Application No. 104116265.
Hollister, Sean, "Intel confirms Dual OS computers that run both Windows and Android," http://www.theverge.com, Jan. 6, 2014, 2 pages.
Hoekstr, Matthew, "Intel SGX for Dummies (Intel SGX Design Objectives)," Intel Developer Zone, Sep. 26, 2013, 3 pages.
Hardy, Norm, "The Confused Deputy (or why capabilities might have been invented)," http://www.cis.upenn.edu/~KeyKOS/ConfusedDeputy.html, 3 pages.
China National Intellectual Property Administration, Notice on Grant of Patent Right for Invention dated Feb. 12, 2019 in Chinese Patent Application No. 201580028293.7, six pages.
European Patent Office, Communication Pursuant to Article 94(3) EPC dated Apr. 3, 2020 in European patent application No. 15 812 809.0-1213, 4 pages total.
Korean Patent Office, Notice of Preliminary Rejection dated Jul. 10, 2020 in Korean patent application No. 2016-7032826, 4 pages total.

* cited by examiner

MANAGEMENT OF AUTHENTICATED VARIABLES

CROSS-REFERENCE TO RELATED APPLICATIONS

This application is a continuation of U.S. patent application Ser. No. 14/317,909, filed Jun. 27, 2014. The content of the above application is hereby incorporated by reference.

TECHNICAL FIELD

An embodiment addresses trusted computing.

BACKGROUND

Basic input/output system (BIOS) software is low level software used to boot up (i.e., perform boot operations such as loading and starting an operating system (OS), testing hardware, and the like) and perform low level operations in a computer system. BIOS (or analogous low level software) may be implemented using the Unified Extensible Firmware Interface (UEFI) open source standard (e.g., UEFI Specification Version 2.4, available at wwwuefiorg/specs/), which is a specification that defines a software interface between an operating system (OS) and platform firmware (a combination of persistent memory and program code and data stored in the persistent memory). UEFI includes components called UEFI variables, which are used in UEFI Secure Boot techniques. UEFI variables are used to save MRC (Memory Reference Code) configuration data, PCH (Platform Control Hub) configuration data, SA (System Agent) configuration data, keys, and the like. UEFI Secure Boot techniques are standardized (e.g., UEFI2.3.1c specification) and some UEFI techniques are implemented in open source arrangements (e.g., edk2sourceforgenet).

A Trusted Platform Module (TPM) is a hardware device that is a secure micro-controller/cryptoprocessor with added cryptographic functionalities. It works with supporting software and firmware to prevent unauthorized access to a computing node. The TPM contains a hardware engine to perform encryption/decryption. The TPM uses its built-in encryption engine during digital signing and key wrapping operations.

Despite the availability of advanced boot up software protocols (e.g., UEFI Secure Boot) and secure cryptoprocessors (e.g., TPMs), malware and the like is still a threat to true trusted computing.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

An embodiment provides runtime access to a cryptoprocessor (e.g., TPM 2.0) and the cryptoprocessor's signature services so firmware can use the cryptoprocessor to create a key internal to the cryptoprocessor, use the key to sign an object (e.g., a UEFI variable), and then verify that signature. This enables at least three use cases. First, a use case includes the ability to enable/disable a trusted execution environment such as, without limitation, an Intel® Secure Enclave (sometime referred to as Intel® Software Guard Extensions (Intel® SGX)), Intel® Management Engine (Intel® ME), and the like. Second, another use case includes variable roll back protection. This may help deter offline attacks on certain memory areas (e.g., UEFI variables stored in serial peripheral interface (SPI) flash memory) by cryptographically binding (e.g., using a cryptographic hash) the variable or variables to the cryptoprocessor (e.g., to a secure memory located within the cryptoprocessor so that the latter can serve as an integrity check against SPI flash being adulterated during a power cycle when the UEFI code in SMM cannot act as a protector or 'guard of the contents'). More information on UEFI/PI usage of SMM can be found U.S. Pat. No. 6,848,046 (assigned to Intel Corp. of Santa Clara, Calif.). Third, yet another use case includes firmware accessing the cryptoprocessor during runtime causing the cryptoprocessor to manipulate (e.g., toggle) a variable that enables/disables one operating system (OS) in exchange for another operating system (e.g., toggling between two OSs that operate on a single platform). Such an embodiment may further include firmware accessing the cryptoprocessor during runtime causing the cryptoprocessor to allocate a first amount of memory to the first OS and a second amount of memory to the second OS. A more detailed discussion regarding various embodiments now follows.

Runtime Access and/or Manipulation of Variables Signed by a Cryptoprocessor

UEFI variables are mentioned above. UEFI variables are susceptible to malicious activities. Specifically, original equipment manufacturers (OEM)/independent BIOS vendors (IBVs) store variable data on a flash region and use system management mode (SMM) to maintain the integrity of the variable data (i.e., there is no confidentiality control, so anyone can read but only trusted entities can write). Thus, the variables are susceptible to malicious activity, such as a "shack attack", which is a low-budget hardware attack where attackers have physical access to the device, but not enough equipment or expertise to attack within the integrated circuit packages. The attackers attempt to connect to the device using JTAG debug, boundary scan I/O, and built-in self-test facilities. They can passively monitor the system using logic probes and network analyzers to snoop bus lines, pins and system signals. The attackers may also be able to perform simple active hardware attacks, such as forcing pins and bus lines to be at a high or low voltage, reprogramming memory devices, and replacing hardware components with malicious alternatives. Other threats include "ROM swipe"/"replacement" style attacks and the like as described, for example, in the XBOX1 attacks by Bunnie Huang (see, e.g., page 18 of http://***.uefidk.com/sites/default/files/resources/Platform_Security_Review_Intel_Cisco_White_Paper.pdf)

To better secure these variables, an embodiment cryptographically binds UEFI variables (and analogous containers or mechanisms for storing configuration information and the like) to the platform by using the cryptographic processor to sign and verify those variables or keep a cryptographic checksum, such as a SHA256 hash of the variable in the TPM NVData. This is possible because, for example, TPM standard version 2.0 supports platform hierarchy and consequently, platform firmware (such as semiconductor integrated code (SIC)) and the OS can both use the TPM, which was not the case with previous TPM standards (e.g., TPM standard 1.2 whereby only the OS could use the TPM). Consequently, a UEFI variable (which firmware needs access to) can be signed by the TPM during runtime and/or hashed by the UEFI PI SMM code and the subsequent hash value stored in TPM (for a subsequent comparison w/ a hash generated on a reboot to see if the value in the TPM and the value derived from the SPI flash 'are the same'). The TPM also has mechanisms to govern access/manipulation of the signed variables. For example, the TPM has strong access controls (e.g., read-lock to prevent reading the variable and write-lock to prevent writing to the variable). Thus, the TPM can, for example, implement READ_LOCK protection (for confidentiality) and WRITE_LOCK protection (for integrity) for the variables.

As will be addressed further below, an embodiment includes storing a private key in the TPM. The key can be used for signing UEFI Variables (or any other data). As a result, no confidentiality statement is required and only integrity protection is needed. This promotes the ability to securely sign data on a target platform for a trusted entity. In an embodiment the trusted entity is SMM. In such an embodiment the SMM (in runtime) establishes trust with other entities that may ask SMM to perform an action on their behalf. Note that although the UEFI variable usages may only need integrity protection in some embodiments, this "signing" capability may be used to "encrypt" the variable store so information like user passwords or other personally identifiable information (PII) can be appropriate occluded from untrustworthy ring 0 OS code.

In other words, the ability to implement any or all of the aforementioned three use cases was not possible with older TPM schemes, such as TPM specification version 1.2, since firmware could not access the TPM once the OS took ownership of the TPM. However, the TPM 2.0 "Platform Hierarchy" allows firmware to continue to access TPM 2.0 resources at runtime, thereby allowing the firmware to manipulate securely stored variables to allow for secure enable/disabling of secure enclaves, prevent roll-back, better implement dual OS scenarios, and/or manipulate any other boot or security critical settings.

The instructions used by firmware to access/interact with the TPM during runtime (and/or during preboot operations) may be provided in SIC or elsewhere. The firmware may include code such as PEI (Pre-EFI initialization) and DXE (Driver eXecution Environment) instructions (e.g., drivers) or other host executed firmware components. Various components that may need to be accessed by the SIC, such as UEFI variables, can be integrity protected by signing them within a secure cryptoprocessor, such as a TPM, or hashed and having the related hash stored in the TPM for subsequent detection across a reboot. UEFI specifications define an application programming interface (API) for variable access (e.g., SetVariable to write/delete a variable, GetVariable to read a variable), which may be used by embodiments to manipulate variables signed by a cryptoprocessor. In an embodiment UEFI variables are accessible during SMM runtime as well as during boottime. During runtime the variables may be accessible to the OS, SMM, and/or firmware (e.g., SIC).

As discussed further below, embodiments provide a means by which the TPM 2.0 signature capabilities can be leveraged by host firmware. Specifically, in one embodiment the TPM 2.0's platform hierarchy can be used to provide the OEM PI code with pre-OS and runtime access to the TPM 2.0 device, whether that device is a 'discrete TPM' dTPM20 (i.e., TPM 2.0 device) or a firmware-based (e.g., ARM TrustZone®, Intel Corp. Platform Trust Technology (PTT)) implementation of a cryptoprocessor. At times herein reference is made to UEFI specific terminology (e.g., PEI and the like) but embodiments are not so limited and are relevant to any host-based firmware execution scheme (e.g., open source ecosystem based firmware such as ***.coreboot.org, and its SMM model of runtime operation).

Conventionally, authenticated UEFI variables are created and signed "off platform" using OS specific tools (e.g., a protected signing server (HSM)). The OS then calls the SetVariable runtime service to enroll an authenticated variable in the firmware (e.g., using a signed blob that is transferred to the UEFI client to do the actual SetVariable() action). Once the associated public key is enrolled in the firmware's stored variables, when the GetVariable runtime service is called, the authenticated variable's signature can be verified. For example, this is how the UEFI Secure Boot PK, KEK, DB, DBX variables are used. However firmware is not able to create and use authenticated variables for its own purposes. As will be addressed further below, embodiments allow for UEFI variables to be created and/or signed "on platform" within the cryptoprocessor (or within regions securely controlled by the cryptoprocessor).

Components for Runtime Access

As mentioned above, an embodiment may use a TPM 2.0 to perform various tasks. For example, an embodiment includes a library of commands (e.g., Tpm2CommandLib) that provides implementations of commands to create a key within the TPM (e.g., TPM2_CreatePrimary), sign an object with the key (e.g., TPM2_Sign), and later verify the signed object (e.g., TPM2_VerifySignature). An SMM driver may call those commands, along with the SetVariable and GetVariable UEFI runtime services. The SMM driver may be a "SMM Authenticated Variable Signature Driver" that uses the TPM 2.0 to sign a data object and also to verify that signature. For the storing of an integrity value (e.g., hash of the entire variable store after every write) in TPM2.0 NVData, commands such as TPM2_NVWrite can be used at runtime under authority of platform hierarchy in SMM and then checked against TPM NVData via a TPM2_NVRead upon reboot to ensure that between the last runtime session and a subsequent reboot (wherein the firmware will be securely authenticated by a platform element such as Intel®

Boot Guard) the values are the same. A more generic description of hardware secure boot can be found in U.S. Pat. No. 7,984,286 (assigned to Intel Corp., Santa Clara, Calif.).

Access to the TPM 2.0 using the platform hierarchy is controlled with an authentication value. Initially this is a known value. Prior to the execution of third party code, firmware changes this authentication value to a secret value. This new secret value must be passed into SMM and stored in SMRAM for use by the SMM drivers at runtime. For example, since BIOS runs upon reset BIOS is the first component to be able to access the TPM 2.0 via the platform hierarchy. To prevent potentially malicious third party code (e.g., malicious option ROM) from using the platform hierarchy to access the TPM, the platform hierarchy's authentication value is changed to a new secret value and that value is saved in SMM for later use. Doing so prevents third party code from accessing the TPM since the third party code does not know the new authentication value.

Creating UEFI Authenticated Variables by Firmware

With the above described frame work firmware can create and manipulate UEFI authenticated variables for its own use. To create an UEFI authenticated variable, the SMM Authenticated Variable Signature Driver's Sign method is called, which will generate an SMI, and the SMM handler will do the following in an embodiment. First, the SMM handler will ensure that there are no outstanding actions on the TPM 2.0 from the OS (if runtime), addressed in greater detail below (see FIG. 4). Second, the SMM handler will assert the platform hierarchy to create a key using the TPM2_CreatePrimary command, if one does not yet exist. Note that TPM 2.0 primary key's private component is stored in a protected location within the TPM 2.0 and never leaves the device in an embodiment. Only the public component (public key corresponding to private key kept in TPM 2.0) is available to firmware. Third, the SMM handler will perform the actual signing of an object using the TPM2_Sign command Fourth, the SMM handler will store the signed object (e.g., an UEFI authenticated variable) in the platform's variable store (e.g., flash memory located on the platform) using the SetVariable UEFI runtime service.

Verifying Firmware Created UEFI Authenticated Variables

In order to verify an UEFI authenticated variable that the firmware created, the SMM Authenticated Variable Signature Driver's Verify method is called, which will generate an SMI, and the SMM handler will (1) ensure that there are no outstanding actions on the TPM 2.0 from the OS (if runtime), (2) assert the platform hierarchy to create a key using the TPM2_CreatePrimary command, if one does not yet exist, and (3) call the GetVariable UEFI runtime service to retrieve the variable data and then authenticate the variable data based on the public key generated by the TPM 2.0 and stored in the flash.

Enabling and Disabling Secure Enclaves

An embodiment uses a secure enclave to provide a trusted execution environment. A secure enclave is a trusted software execution environment which prevents software executing outside the enclave from having access to software and data inside the enclave.

Various embodiments of secure enclaves are described in, for example, the U.S. patent application entitled "Method and Apparatus to Provide Secure Application Execution", filed Nov. 13, 2009 (Ser. No. 12/590,767); the PCT Patent Application entitled "Method and Apparatus to Provide Secure Application Execution", filed Dec. 22, 2009 (Application No. PCT/US2009/069212); the U.S. patent application entitled "System and Method for Implementing a Trusted Dynamic Launch and Trusted Platform Module (TPM) Using Secure Enclaves", filed Dec. 22, 2010 (Ser. No. 12/976,831); the PCT Patent Application entitled "Technologies For Hardening The Security Of Digital Information On Client Platforms", filed Jun. 4, 2013 (Application No. PCT/US2013/44158); "Using Innovative Instructions to Create Trustworthy Solutions" (by Matthew Hoekstra et al.), "Innovative Instructions and Software Model for Isolated Execution" (by Frank Mckeen et al.), and other papers presented at The Second Workshop on Hardware and Architectural Support for Security and Privacy, In Conjunction with ISCA 40, Jun. 24, 2013 in Tel-Aviv, Israel. Consequently, details regarding operation of secure enclaves are not entirely addressed herein. These applications and papers are referred to herein collectively as the "secure enclave materials."

As described in the secure enclave materials, a secure enclave is carved out of the virtual address space of its containing process. Memory management of the enclave is performed in terms of virtual addresses. In an embodiment enclave memory management is divided into two parts: address space allocation and memory commitment. Address space allocation is the specification of a maximal range of addresses that the enclave may use. No actual resources are committed to this region. Memory commitment is the assignment of actual memory resources (as pages) within the allocated address space. This two-phase technique allows enclaves to flexibly control their memory usage and allow for growth without overusing memory resources when enclave needs are low. Commitment adds virtual pages to the enclave.

This distinction is reflected in the two instructions ECREATE and EADD. ECREATE allocates a range of addresses for use by the enclave. EADD commits virtual memory pages within that range to the enclave. An operating system may support separate allocate and commit operations. For example, the Windows API VirtualAlloc takes a flag argument of MEM_RESERVE (allocation) or MEM_COMMIT (commitment). It is not required that an OS support this separation, but its presence can make memory management within an enclave more flexible and efficient.

In one embodiment, a secure enclave is created using the ECREATE instruction, specifying a base and size of the virtual address space range in which the enclave is to be built. Memory is added to the secure enclave before it is sealed. The enclave creation and commitment process is best illustrated, for example, by using the Windows API and proceeds as follows: (1) reserve address space region in the process using VirtualAlloc, passing in the MEM_RESERVE flag (which reserves a region of memory without actually committing any physical memory or page file storage); (2) commit the first page of the enclave by calling VirtualAlloc again, this time with the MEM_COMMIT flag; (3) use the ECREATE instruction to set up the initial environment, specifying the same address range as above (i.e., ECREATE allocates a region of virtual memory within the application for hosting the secure code and data); and (4) for each additional page to be added to the enclave: VirtualAlloc the enclave page, use EADD to add the new page to the enclave, use EEXTEND to add a measurement for 128 bytes of the page (EEXTEND updates the measurement of the enclave to include the code or data added in EADD), and call this instruction until the entire enclave is measured (e.g., a measurement may include a cryptographic hash of the code and data in an enclave at the time it is initialized). If a contiguous set of enclave pages is to be added at once, the above steps can be reordered and optimized to minimize the number of system calls. On operating systems that do not support separate reserve and commit operations, the VirtualAlloc above can be replaced by a simple malloc, for example, and the remaining calls to VirtualAlloc eliminated.

Because the ECREATE and EADD instructions enable encryption and integrity for the added page, it is not possible for non-enclave software to initialize this memory after it has been added to the enclave. The runtime system must completely initialize any memory for which it is responsible before EADDing it. This typically requires the runtime system to build the enclave image in-place, even before calling ECREATE (i.e., because SECS cannot be modified by software after ECREATE). Once memory has been initialized, the enclave ECREATEd and its memory EADDed, it may be sealed and measured as described herein.

In one embodiment, there are two data structures inside the enclave, the Secure Enclave Control Store (SECS) and the Thread Control Structure (TCS). SECS and TCS contain architectural information and non-architectural convenience fields used by the runtime software. Once the SECS, one or more TCSs, and the code and data have been EADDed, the enclave creation is completed by the EINIT instruction. This instruction stops further measurement information from being written into a measurement register (MR) (sometimes referred to in the co-pending applications as "IR0"). In other words, EINIT locks down the contents of the enclave and ensures that only the code within the enclave has access to the data regions in the same enclave. After EINIT no further pages may be added to the enclave.

Untrusted code calls into the enclave using the EENTER instruction and the enclave returns back to the untrusted caller via EEXIT. On enclave entry, control is transferred to code which switches the stack pointer to one inside the enclave. When returning the software again swaps the stack pointer then executes the EEXIT instruction.

Thus, once the enclave has been created and initialized with EINIT, attempted accesses to the enclave's memory from unauthorized software, even software such as virtual machine monitors, BIOS, or operating system functions operating at a higher privilege level than the enclave itself, are prevented. From a physical point of view, while enclave data is resident within registers, caches, or other logic blocks inside the processor package, unauthorized access via software is prevented by CPU logic. Whenever enclave data leaves the on-package caches to be written to platform memory, the data is automatically encrypted and its integrity is protected. This prevents malicious individuals from using memory probes or other techniques to view, modify, or replay data or code contained within the enclave.

The immediately preceding description discusses various mechanisms for instantiating secure enclaves. Disabling secure enclaves may occur in a similar manner by disabling the memory configuration necessary for establishing the secure enclave during the following boot.

An embodiment improves upon the enabling/disabling of secure enclaves. For example, memory can be established for secure enclaves during the boot process. Usage of an UEFI Authenticated Variable can allow for a trusted entity to enable/disable memory that is used to establish secure enclaves. By changing the state of the UEFI Authenticated Variable, BIOS is able to securely disable or extend the memory configuration necessary for establishing the secure enclave during the following boot. For example, an OEM-signed OS resident driver may issue an enable/disable request to the SMM driver, whether through ACPI Comm buffer or via direct 0xB2 port access. The SMM code will either create the Enable/Disable variable upon first invocation, or update an existing variable use upon establishing a trust relationship with the invoker.

The problem being addressed with the secure enclave enable/disable is that there is a desire for a secure means to allow turning the secure enclave feature on and off, especially for client systems that are sensitive for memory usage (i.e., forego secure enclave memory allocation to not violate the memory requirements), compounded with the need to ensure that a machine does not have variable storage corrupted across power cycles.

The SMM driver being trusted helps prevent the TPM from becoming a "confused deputy" that responds to any caller (see, e.g., http*www.cis.upenn.edu/~KeyKOS/ConfusedDeputy*html).

A computing node (e.g., Smartphones, tablets, notebooks, laptops, Ultrabooks®, automobiles, aviation drones, fitness bands worn on the wrist/body to monitor biological data, spectacles that provide internet access, combinations thereof such as a hybrid tablet and Smartphone, and the like) may include multiple secure memory enclaves which may be enabled/disabled independently of one another.

Figure 1:
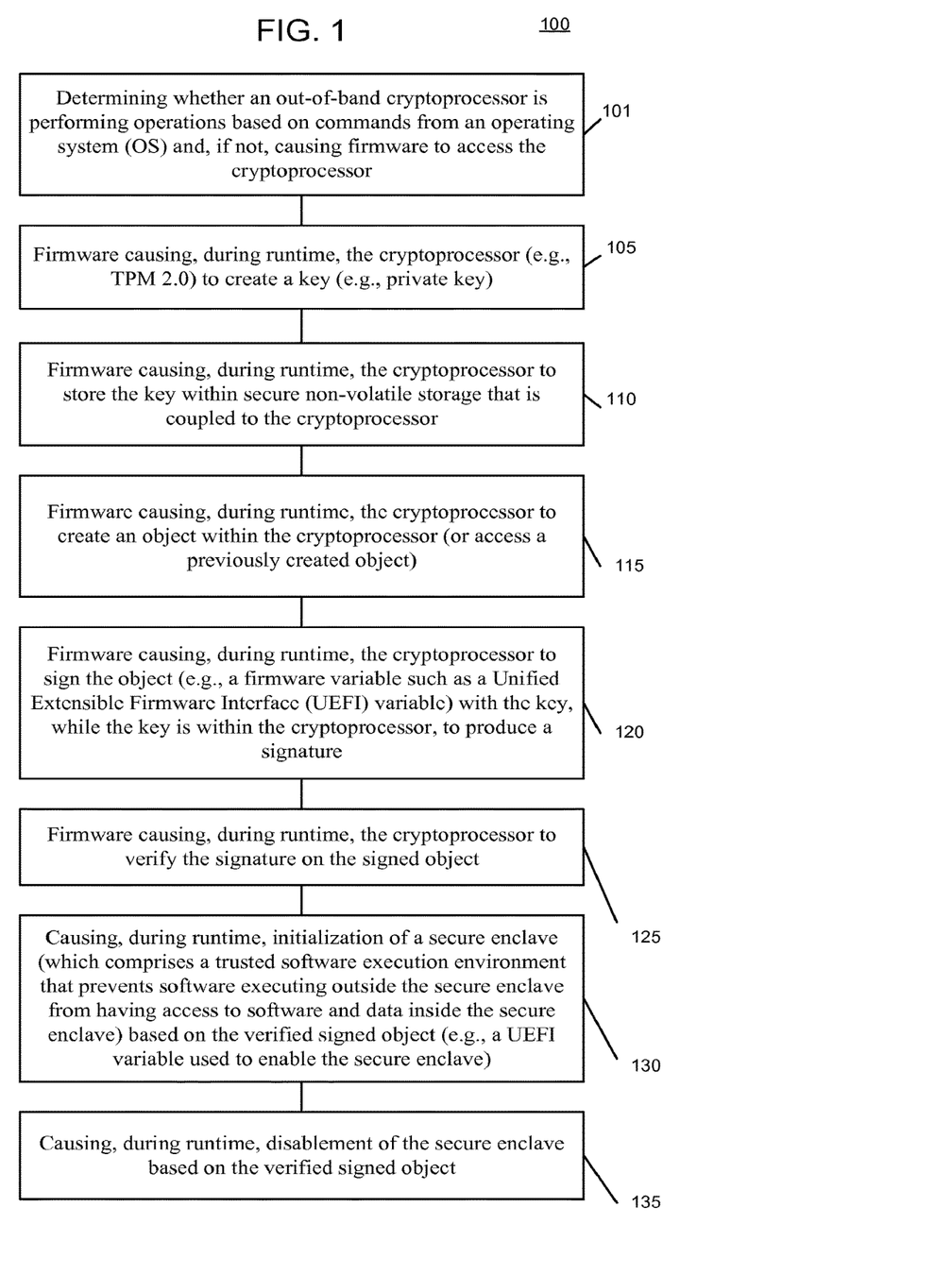
FIG. 1 includes a process in an embodiment of the invention regarding enabling/disabling secure enclaves.

FIG. 1 includes a process 100 in an embodiment of the invention.

Block 101 is optional and includes determining whether an out-of-band cryptoprocessor is performing operations based on commands from an OS and, if not, causing firmware to access the cryptoprocessor. An example method for making this determination is addressed below with regard to FIG. 4.

Block 105 includes firmware causing, during runtime, the cryptoprocessor (e.g., TPM 2.0) to create a key (e.g., private key). Creating the key may be done once per boot cycle or TPM 2.0 startup session. Once the key has been created (e.g., using the TPM2_CreatePrimary command) the key exists until the next power cycle, OS boot, and/or TPM 2.0 startup session. In some cryptoprocessors with limited storage the processor may only be able to create a limited number of keys (e.g., three keys) before running out of memory resources. Once created, the key can be reused via its handle. The key may be recreated at a later time (e.g., the next power cycle, OS boot, and/or TPM 2.0 startup session) with the same seed used to create previous versions of the key.

Block 110 includes firmware causing, during runtime, the cryptoprocessor to store the key within secure non-volatile storage that is coupled to the cryptoprocessor (within the TPM 2.0 protected memory area). Thus, firmware calling the TPM2_CreatePrimary command (directly or indirectly) causes (directly or indirectly) the key to be created and to be stored.

Block 115 includes the firmware causing, during runtime, the cryptoprocessor to create an object within the cryptoprocessor. Block 120 includes firmware causing, during runtime, the cryptoprocessor to sign the object (e.g., a firmware variable such as a UEFI variable) with the key, while the key is within the cryptoprocessor, to produce a signature. However, in another embodiment the object to be signed is not created within the cryptoprocessor. Instead, the object is passed to the cryptoprocessor (e.g., TPM 2.0) as one of the parameters to the TPM2_Sign command. The signed object is returned outside the cryptoprocessor and is not stored in the TPM 2.0. The signed object is then stored as an UEFI authenticated variable (e.g., using the UEFI SetVariable(SGX enable value) command) indicating whether a secure enclave is enabled or disabled.

Block 125 includes firmware causing, during runtime, the cryptoprocessor to verify the signature on the signed object. However, in another embodiment there is no need to verify the signed object at this point in process 100. For example, verification of the signed object (by the cryptoprocessor) may occur when the secure enclave (e.g., Intel® SGX) enable value variable/object is accessed using the UEFI GetVariable(SGX enable value/object) command. Verification by the cryptoprocessor would be optional (e.g., the public key, which corresponds to the key generated in block 105, may be used for verification).

Block 130 includes, during runtime, initializing a secure enclave (which comprises a trusted software execution environment that prevents software executing outside the secure enclave from having access to software and data inside the secure enclave) based on the verified signed object (e.g., an authenticated UEFI variable used to enable the secure enclave). Block 135 includes, during runtime, disabling the secure enclave based on the verified signed object. In an embodiment the cryptoprocessor is not responsible for enabling/disabling the secure enclave. Instead, the BIOS (via the host processor) does so. For example, the BIOS will not establish memory to be used for the enclave and will not enable the processor features necessary to establish an enclave if the BIOS determines that an authenticated variable disabling secure enclaves exists in memory (e.g., flash memory). In an embodiment the variable may be integrity protected (e.g., write protected) but not confidentiality protected (e.g., read protected).

Preventing Rollback

An embodiment protects platforms from offline attacks on the UEFI variable store (i.e., memory where variables are stored) where such attacks implement rollback of UEFI variables to previous insecure values. Once otherwise secure configurations are "rolled back" to insecure configures, the platform is compromised. Specifically, an embodiment prevents an attempt to roll back to a variable store prior to when its "dbx" UEFI Secure Boot variable was updated to block a compromised certificate. An embodiment does this by cryptographically binding the UEFI variable store in SPI flash to the platform. On each variable update (i.e., each call of SetVariable) a hash of the variable store is calculated and then the hash is stored in a protected TPM 2.0 NV location. This NV index can be protected with a TPM 2.0 access policy such that, for example, it can only be read or written by the platform hierarchy. Then, early in a boot cycle and before the first access of the variable store, the variable store hash is calculated and compared to the stored value in TPM 2.0 NV flash in order to assess if the hash written by the UEFI code after last variable 'write' or update is consistent w/ the present state of the variable store.

Figure 2:
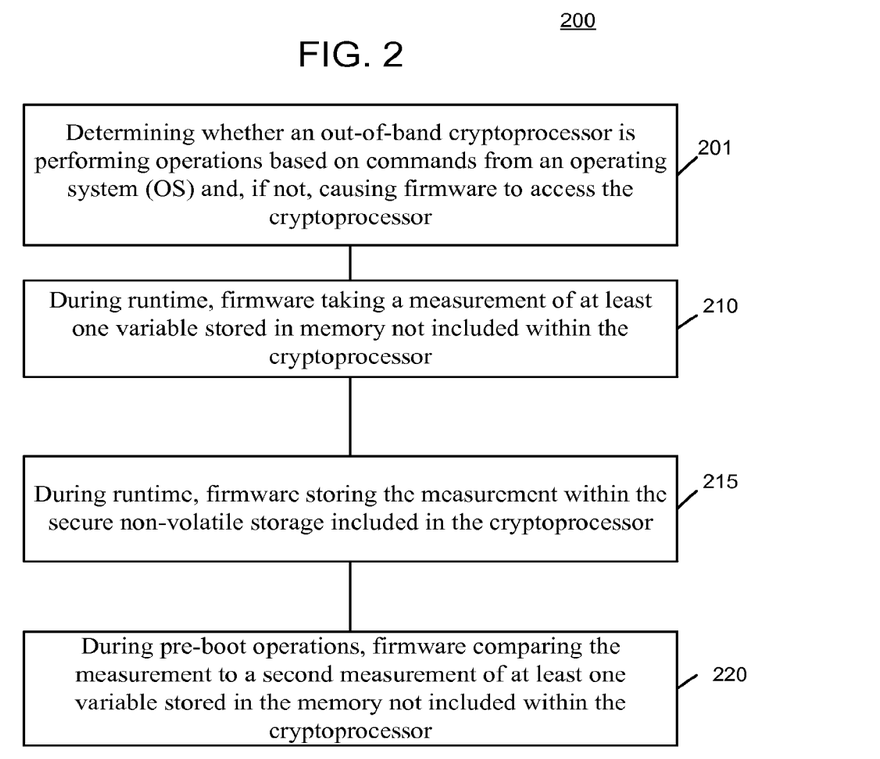
FIG. 2 includes a process in an embodiment of the invention regarding anti-rollback of variable (UEFI variable) stores.

FIG. 2 includes a process 200 in an embodiment of the invention.

Block 201 is optional and includes determining whether an out-of-band cryptoprocessor is performing operations based on commands from an OS and, if not, causing firmware to access the cryptoprocessor. An example method for making this determination is addressed below with regard to FIG. 4.

An optional element includes firmware causing, during runtime, the cryptoprocessor (e.g., TPM 2.0) to create and store a key (e.g., private key). However, in other embodiments the need to create and store a key is not needed as a hash (described below) is not signed in some embodiments. Block 210 includes, during runtime, firmware (BIOS) taking a measurement of at least one variable stored in memory not included within the cryptoprocessor. Block 215 includes the firmware, during runtime, storing the measurement within the secure non-volatile storage included in the cryptoprocessor. For example, in an embodiment when the UEFI SetVariable( ) command is called the command changes the variable store. Consequently, a new hash of the variable store is calculated. That hash (i.e., an object) is then stored in the TPM NV anti-rollback location that was previously provisioned. In an embodiment the hash is not signed. In this way the NV location always contains the hash of the current variable store.

Block 220 includes, during pre-boot operations, comparing the measurement to a second measurement of at least one variable stored in the memory not included within the cryptoprocessor. For example, when the system reboots, before the first SetVariable call, the firmware (e.g., BIOS) hashes the variable store and compares that hash to the value in the cryptoprocessor's secure memory (e.g., TPM2 NV location). If the hashes differ, this is evidence the variable store was altered. For example, such an alteration may have occurred while the system was powered down (i.e., flash memory containing the variable store was modified to an old value including revoked keys using a flash programmer or some such device).

Accomodating Multiple OSs

Figure 3:
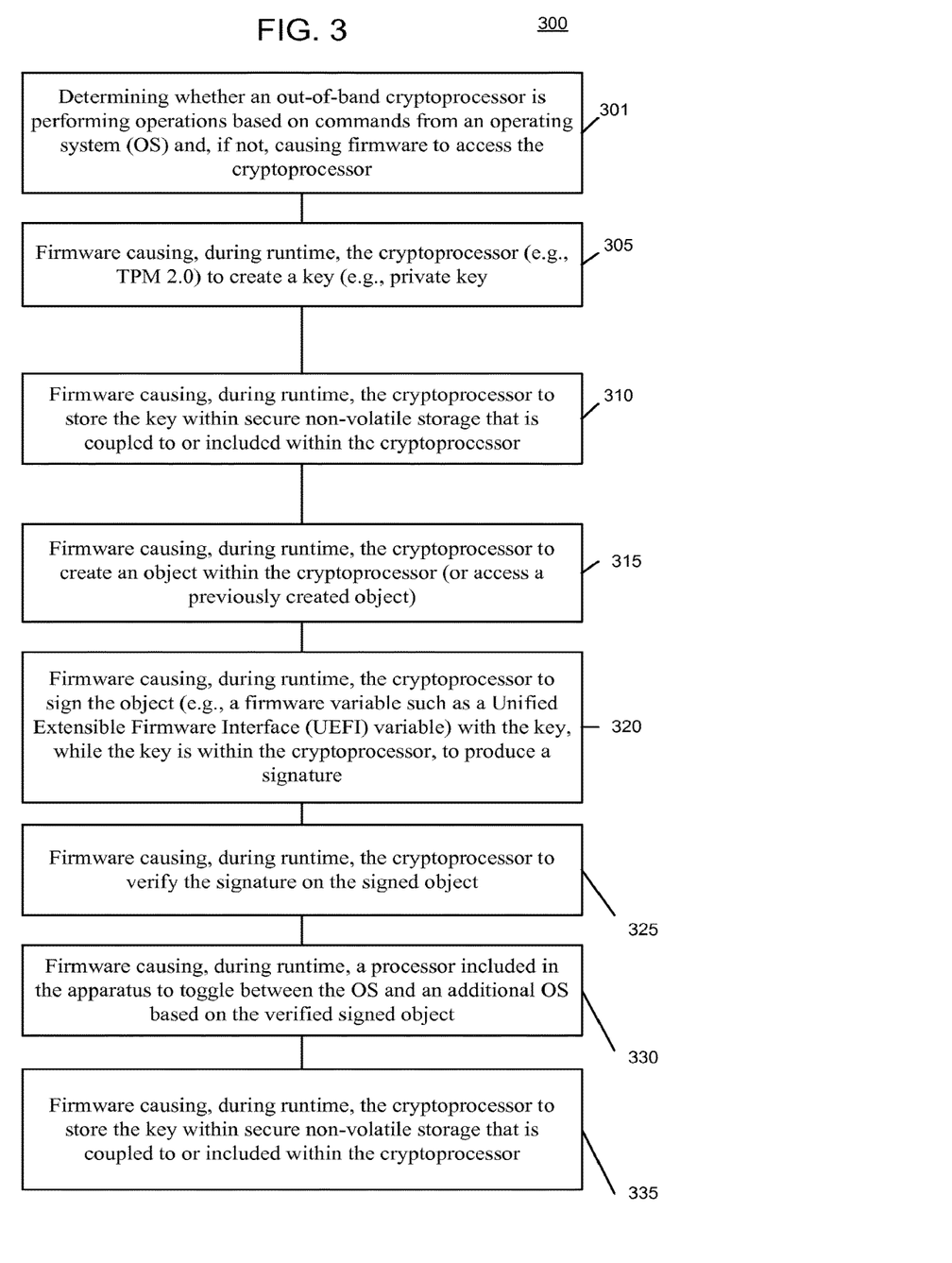
FIG. 3 includes a process in an embodiment of the invention regarding securely toggling between multiple OSs.

FIG. 3 includes a process 300 in an embodiment of the invention.

Block 301 is optional and includes determining whether an out-of-band cryptoprocessor is performing operations based on commands from an OS and, if not, causing firmware to access the cryptoprocessor. An example method for making this determination is addressed below with regard to FIG. 4.

Block 305 includes firmware causing, during runtime, the cryptoprocessor (e.g., TPM 2.0) to create a key (e.g., private key). Block 310 includes firmware causing, during runtime, the cryptoprocessor to store the key within secure non-volatile storage that is coupled to the cryptoprocessor (e.g., included within the cryptoprocessor). Block 315 is optional and includes firmware causing, during runtime, the cryptoprocessor to create an object within the cryptoprocessor (or to access a previously created object by, for example, receiving an object as a parameter to the TPM2_Sign command). Block 320 includes firmware causing, during runtime, the cryptoprocessor to sign the object (e.g., a firmware variable such as a UEFI variable) with the key, while the key is within the cryptoprocessor, to produce a signature. The signed object may be returned outside the cryptoprocessor and not stored in the cryptoprocessor. Block 325 includes firmware causing, during runtime, the cryptoprocessor to verify the signature on the signed object (although verification may occur at a later time such as when the variable is accessed).

Block 330 includes firmware causing, during runtime, the host processor included in the apparatus to toggle control between the OS (e.g., Microsoft Windows®) and an additional OS (e.g., Android™) based on the verified signed object. Block 335 includes firmware causing, during runtime, a processor (e.g., the host processor) to allocate memory between the OS and an additional OS based on the verified signed object.

OS and Firmware Conflicts in Accessing TPM

Figure 4:
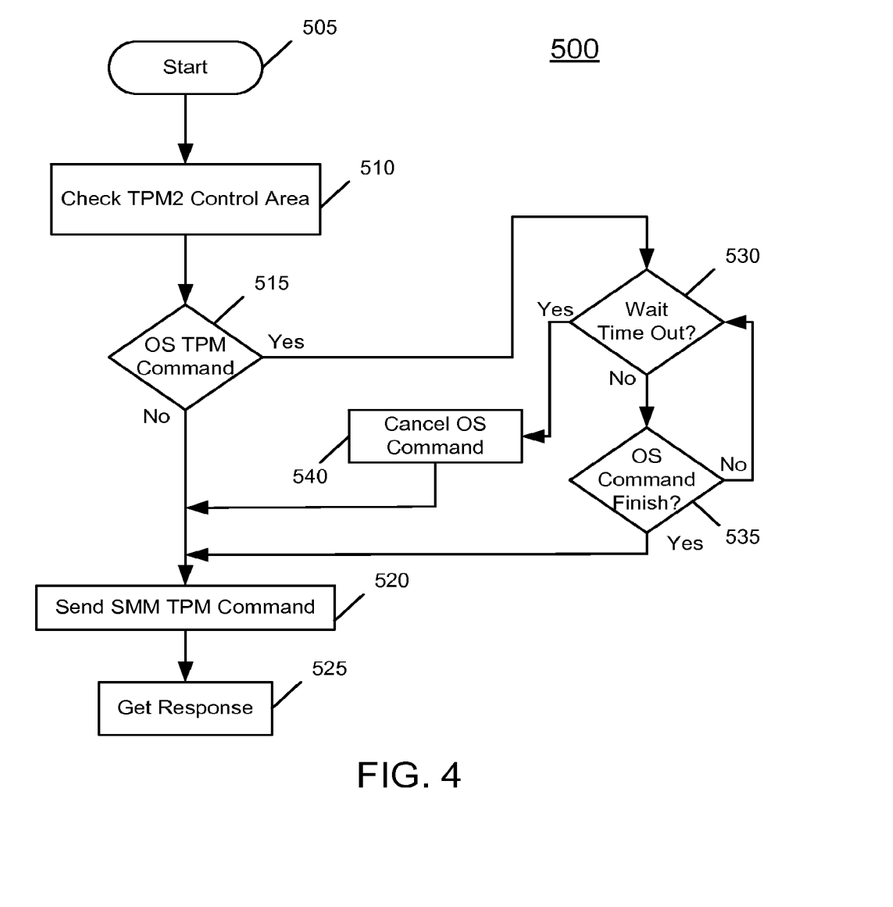
FIG. 4 includes a process in an embodiment of the invention for avoiding conflicts between an OS and firmware when the firmware is attempting to access a secure cryptoprocessor.

FIG. 4 includes a process in an embodiment of the invention.

FIG. 4 includes a process for OS and SMM operations accessing a TPM in an embodiment of the invention. There are several ways to allow SMM/OS TPM access. An SMM driver may prevent contention between the firmware and OS both trying to access the TPM 2.0 at runtime using the TPM2.0 Advanced Configuration and Power Interface (ACPI) table. For example, TPM 2.0 requests can come to the TPM 2.0 SMM access driver from the BIOS or the OS (via the TPM2 ACPI table). The TPM 2.0 access driver prevents contention between the firmware and OS by knowing if a previous request is in process when a new request comes in from either source. ACPI (***.uefi.org) is a standard for communicating between the OS and firmware. Firmware/BIOS creates ACPI tables that provide a description of the platform to the OS. These tables include methods the OS may use to make requests to the bios (i.e., the OS can make a request to the TPM 2.0 by invoking a method on the TPM2 ACPI table). The TPM 2.0 Table is a data structure in memory created by the BIOS during boot for use by the OS.

Regarding FIG. 4, the process starts in block 505 and in block 510 in SMM the system checks a TPM.STATUS bit. If there is already an OS TPM command present (block 515) then the system waits for the OS TPM command to finish (block 530). Upon a time out the system cancels the command (block 540) or continues to wait for the OS command to finish (block 535). After blocks 535, 540 the system sends the SMM TPM command (block 520) knowing there is no longer a conflict with an OS command A response can then be obtained (block 525). In block 515 if there is no OS TPM command present the process may proceed to block 520.

In other embodiments, the SMM TPM command may be placed in a queue, and a periodic system management interrupt (SMI) may be used to check TPM state (e.g., is an OS command present?) in a periodic SMI handler. Another embodiment traps all TPM Accesses (e.g., OS TPM accesses), and always accesses TPM hardware in SMM (so there is no conflict with SIC or OS TPM accesses).

An embodiment uses security control, like read_only and write_only, to protect the UEFI variables.

While UEFI variables and TPMs are addressed herein for many of the embodiments, this is done for ease of explanation and brevity and does not imply all embodiments are limited to either of UEFI variables or TPMs. Other embodiments may be used with other pre-boot code, boot code, initialization code, and/or BIOS code as well as with other secure cryptoprocessors and/or secure storage mechanisms. Furthermore, specific standards are mentioned for brevity but embodiments are not limited to any one BIOS or TPM standard or any other standard.

At times above a variable is said to be stored in cryptoprocessor NV storage. However, in various embodiments such variables may include a hash (or other space saving abbreviation or derivative) of a variable. The hash/derivative may be what is stored in the NV, where storage space may be limited. This arrangement allows for a much larger set of variables to be mapped to a possibly smaller set of cryptoprocessor NV memory.

Embodiments discussed herein may utilize a system such as the system of FIG. 5, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 5:
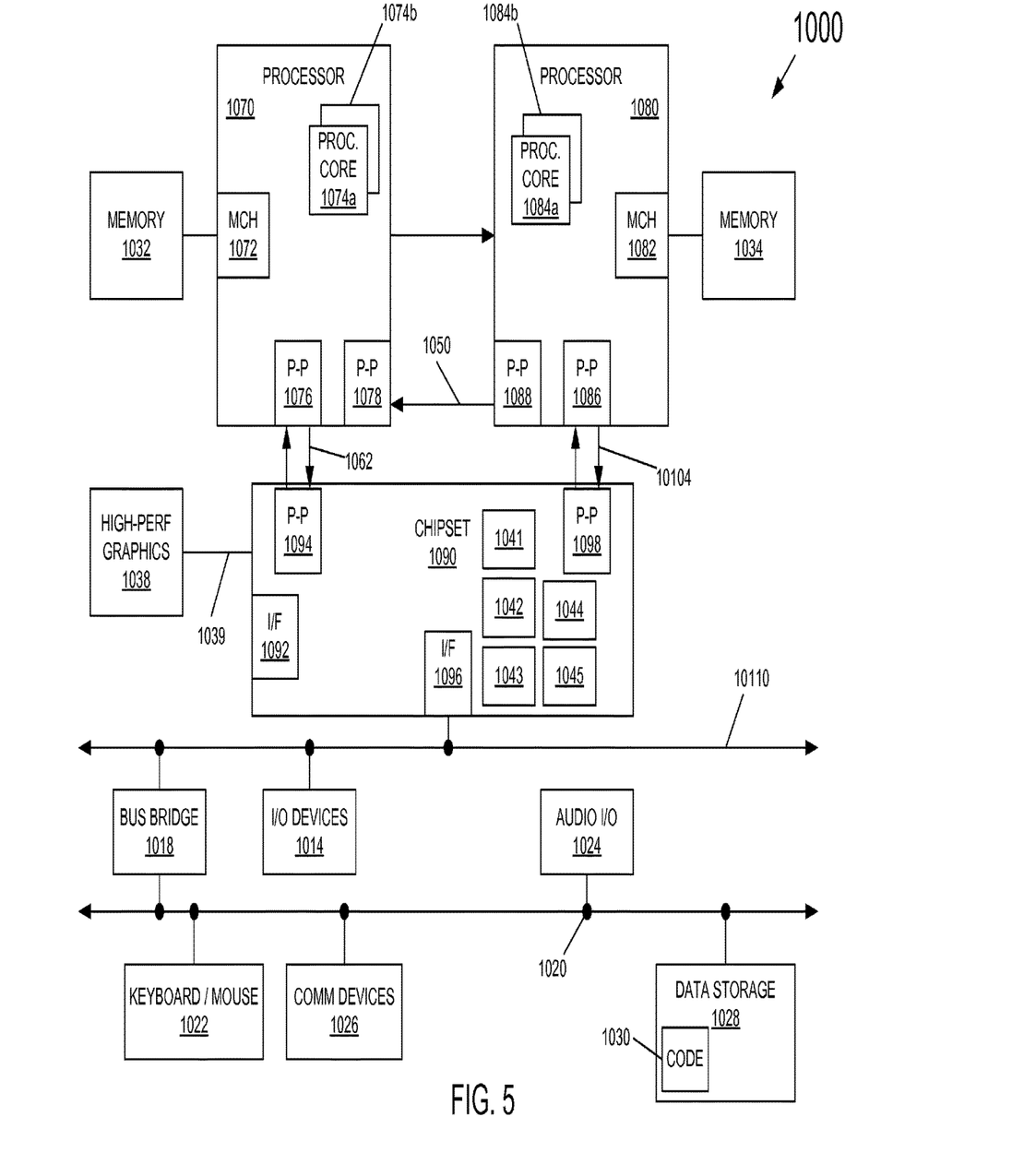
FIG. 5 includes a system for use with an embodiment of the invention.

Referring now to FIG. 5, shown is a block diagram of a system embodiment 1000 in accordance with an embodiment of the present invention. System 1000 may be included in, for example, a mobile computing node such as a cellular phone, smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discreet logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of FIG. 5 may alternatively be partitioned using more or fewer integrated chips than shown in the FIG. 5.

Example 1 includes an apparatus comprising: an out-of-band cryptoprocessor coupled to secure non-volatile storage; and at least one storage medium having firmware instructions stored thereon for causing, during runtime and after an operating system for the apparatus has booted, the cryptoprocessor to (a) store a key within the secure non-volatile storage, (b) sign an object with the key, while the key is within the cryptoprocessor, to produce a signature, and (c) verify the signature.

In example 2 the subject matter of Example 1 can optionally include wherein the object includes a Unified Extensible Firmware Interface (UEFI) variable, the firmware includes platform initialization (PI) firmware, the cryptoprocessor is a trusted product module (TPM) implemented in at least one of firmware and hardware, and the TPM is out-of-band with the processor.

In example 3 the subject matter of Examples 1-2 can optionally wherein the object includes a firmware variable.

In example 4 the subject matter of Examples 1-3 can optionally include wherein the key is a private key and the cryptoprocessor includes the secure non-volatile storage; wherein the at least one storage medium has firmware instructions stored thereon for causing the cryptoprocessor to communicate a public key, corresponding to the private key, outside of the cryptoprocessor while retaining the private key within the cryptoprocessor.

In example 5 the subject matter of Examples 1-4 can optionally include wherein the at least one storage medium has firmware instructions stored thereon for causing the cryptoprocessor to perform at least one of (a) creating the object within the cryptoprocessor, and (b) creating the key.

In example 6 the subject matter of Examples 1-5 can optionally include wherein the at least one storage medium has firmware instructions stored thereon for initializing a secure enclave comprising a trusted software execution environment that prevents software executing outside the secure enclave from having access to software and data inside the secure enclave.

In example 7 the subject matter of Examples 1-6 can optionally include wherein initializing the secure enclave is based on enabling the object, which includes a firmware variable.

In example 8 the subject matter of Examples 1-7 can optionally include wherein the at least one storage medium has firmware instructions stored thereon for disabling the secure enclave.

In example 9 the subject matter of Examples 1-8 can optionally include wherein the at least one storage medium has firmware instructions stored thereon for determining, during runtime, a measurement of at least one variable stored in memory not included within the cryptoprocessor.

In example 10 the subject matter of Examples 1-9 can optionally include wherein the at least one storage medium has firmware instructions stored thereon for storing the measurement within the secure non-volatile storage.

In example 11 the subject matter of Examples 1-10 can optionally include wherein the at least one storage medium has firmware instructions stored thereon for, during pre-boot operations and before runtime, comparing the measurement to a second measurement of the at least one variable stored in the memory not included within the cryptoprocessor.

In example 12 the subject matter of Examples 1-11 can optionally include wherein the at least one storage medium has firmware instructions stored thereon for causing, during System Management Mode (SMM) runtime, the cryptoprocessor to (a) store the key within the secure non-volatile storage, (b) sign the object with the key, and (c) verify the signature.

Example 13 the subject matter of Examples 1-12 can optionally include wherein the at least one storage medium has firmware instructions stored thereon for causing execution of instructions within the cryptoprocessor during pre-boot operations.

In example 14 the subject matter of Example 13 can optionally include a processor, wherein the variable enables toggling control of the processor between the operating system and an additional operating system.

In example 15 the subject matter of Examples 1-14 can optionally include wherein the variable enables memory allocation between the operating system and an additional operating system.

In example 16 the subject matter of Examples 1-15 can optionally include wherein the cryptoprocessor includes the secure non-volatile storage, the firmware includes instructions not included in the operation system, and the at least one storage medium is non-transitory.

In example 17 the subject matter of Examples 1-16 can optionally include wherein the at least one storage medium has firmware instructions stored thereon for determining the operating system is not accessing the cryptoprocessor and, in response to the determining, causing the firmware instructions to access the cryptoprocessor.

Example 18 includes an out-of-band cryptoprocessor coupled to secure non-volatile storage; and at least one storage medium having firmware instructions stored thereon for (a) determining, during runtime, a measurement of at least one variable stored in memory not included within the cryptoprocessor, (b) storing, during runtime, the measurement within the secure non-volatile storage, and (c) comparing, during pre-boot operations and before runtime, the measurement to a second measurement of the at least one variable stored in the memory not included within the cryptoprocessor.

In example 19 the subject matter of Example 18 can optionally include a processor, wherein the at least one variable includes a Unified Extensible Firmware Interface (UEFI) variable, the cryptoprocessor is a trusted product module (TPM) implemented in at least one of firmware and hardware, and the TPM is out-of-band with the processor.

In example 20 the subject matter of Examples 18-19 can optionally include wherein the at least one storage medium has firmware instructions stored thereon for, during runtime and after an operating system for the apparatus has booted, the cryptoprocessor to (a) store a key within the secure non-volatile storage, (b) sign the at least one variable with the key, while the key is within the cryptoprocessor, to produce a signature, and (c) verify the signature.

In example 21 the subject matter of Examples 18-20 can optionally include wherein the at least one storage medium has firmware instructions stored thereon for initializing a trusted software execution environment that prevents software executing outside the secure enclave from having access to data inside the secure enclave.

In example 22 the subject matter of Examples 18-21 can optionally include wherein initializing the secure enclave is based on enabling the at least one variable.

Example 23 includes At least one storage medium having firmware instructions stored thereon for causing a system to: during runtime and after an operating system for the apparatus has booted, (a) store a key within secure non-volatile storage included in an out-of-band cryptoprocessor, (b) sign an object with the key, while the key is within the cryptoprocessor, to produce a signature, and (c) verify the signature. a cryptoprocessor including.

In example 24 the subject matter of Example 23 can optionally include wherein the object includes a firmware variable.

In example 25 the subject matter of Examples 23-24 can optionally include initializing a secure enclave comprising a trusted software execution environment that prevents software executing outside the secure enclave from having access to software and data inside the secure enclave based on enabling the firmware variable.

Example 1a includes a method executed by at least one processor comprising: firmware causing, during runtime and after an operating system for an apparatus has booted, a cryptoprocessor to (a) store a key within secure non-volatile storage, (b) sign an object with the key, while the key is within the cryptoprocessor, to produce a signature, and (c) verify the signature; wherein the cryptoprocessor is included in the apparatus, is out-of-band, and is coupled to the secure non-volatile storage.

In example 2a the subject matter of Example 1a can optionally include wherein the object includes a Unified Extensible Firmware Interface (UEFI) variable, the firmware includes platform initialization (PI) firmware, the cryptoprocessor is a trusted product module (TPM) implemented in at least one of firmware and hardware, and the TPM is out-of-band with the processor.

In example 3a the subject matter of Examples 1a-2a can optionally include wherein the object includes a firmware variable.

In example 4a the subject matter of Examples 1a-3a can optionally include. wherein the key is a private key and the cryptoprocessor includes the secure non-volatile storage; the method comprising the firmware causing the cryptoprocessor to communicate a public key, corresponding to the private key, outside of the cryptoprocessor while retaining the private key within the cryptoprocessor.

In example 5a the subject matter of Examples 1a-4a can optionally include the firmware causing the cryptoprocessor to perform at least one of (a) creating the object within the cryptoprocessor, and (b) creating the key.

In example 6a the subject matter of Examples 1a-5a can optionally include the firmware initializing a secure enclave comprising a trusted software execution environment that prevents software executing outside the secure enclave from having access to software and data inside the secure enclave.

In example 7a the subject matter of Examples 1a-6a can optionally include wherein initializing the secure enclave is based on enabling the object, which includes a firmware variable.

In example 8a the subject matter of Examples 1a-7a can optionally include the firmware disabling the secure enclave.

In example 9a the subject matter of Examples 1a-8a can optionally include the firmware determining, during runtime, a measurement of at least one variable stored in memory not included within the cryptoprocessor.

In example 10a the subject matter of Examples 1a-9a can optionally include the firmware storing the measurement within the secure non-volatile storage.

In example 11a the subject matter of Examples 1a-10a can optionally include the firmware, during pre-boot operations and before runtime, comparing the measurement to a second measurement of the at least one variable stored in the memory not included within the cryptoprocessor.

In example 12a the subject matter of Examples 1a-11a can optionally include the firmware causing, during System Management Mode (SMM) runtime, the cryptoprocessor to (a) store the key within the secure non-volatile storage, (b) sign the object with the key, and (c) verify the signature.

In example 13a the subject matter of Examples 1a-12a can optionally include the firmware causing execution of instructions within the cryptoprocessor during pre-boot operations.

In example 14a the subject matter of Examples 1a-13a can optionally include wherein the variable enables toggling control of the processor between the operating system and an additional operating system.

In example 15a the subject matter of Examples 1a-14a can optionally include wherein the variable enables memory allocation between the operating system and an additional operating system.

In example 16a the subject matter of Examples 1a-15a can optionally include wherein the cryptoprocessor includes the secure non-volatile storage.

In example 17a the subject matter of Examples 1a-16a can optionally include the firmware determining the operating system is not accessing the cryptoprocessor and, in response to the determining, the firmware accessing the cryptoprocessor.

Example 18a includes a method executed by at least one processor comprising: firmware (a) determining, during runtime, a measurement of at least one variable stored in memory not included within a cryptoprocessor, (b) storing, during runtime, the measurement within secure non-volatile storage, and (c) comparing, during pre-boot operations and before runtime, the measurement to a second measurement of the at least one variable stored in the memory not included within the cryptoprocessor; wherein the cryptoprocessor is out-of-band and coupled to the secure non-volatile storage.

In example 19a the subject matter of Example 18a can optionally include wherein the at least one variable includes a Unified Extensible Firmware Interface (UEFI) variable, and the cryptoprocessor is a trusted product module (TPM) implemented in at least one of firmware and hardware.

In example 20a the subject matter of Examples 18a-19a can optionally include the firmware, during runtime and after an operating system for the apparatus has booted, causing the cryptoprocessor to (a) store a key within the secure non-volatile storage, (b) sign the at least one variable with the key, while the key is within the cryptoprocessor, to produce a signature, and (c) verify the signature.

In example 21a the subject matter of Examples 18a-20a can optionally include the firmware initializing a trusted software execution environment that prevents software executing outside the secure enclave from having access to data inside the secure enclave.

In example 22a the subject matter of Examples 18a-21a can optionally include wherein initializing the secure enclave is based on enabling the at least one variable.

Example 23a includes a processing apparatus comprising: means for, during runtime and after an operating system for the apparatus has booted, (a) storing a key within secure non-volatile storage included in an out-of-band cryptoprocessor, (b) signing an object with the key, while the key is within the cryptoprocessor, to produce a signature, and (c) verifying the signature.

In example 24a the subject matter of Example 23a can optionally include wherein the object includes a firmware variable.

In example 25a the subject matter of Examples 23a-24a can option include means for initializing a secure enclave comprising a trusted software execution environment that prevents software executing outside the secure enclave from having access to software and data inside the secure enclave based on enabling the firmware variable.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor;
a cryptoprocessor that is out-of-band with the processor; and
at least one storage medium storing firmware instructions, wherein the firmware instructions are to cause the cryptoprocessor to:
create a firmware variable within the cryptoprocessor during runtime and after an operating system of the apparatus has booted, wherein the firmware variable is a data object that can be accessed by both the firmware and the operating system during runtime, wherein the operating system is executed on the processor; and
generate a signature of the firmware variable, wherein the at least one storage medium is non-transitory.

2. The apparatus of claim 1, further comprising:
a secure non-volatile storage to store a key,
wherein the firmware instructions are to cause the cryptoprocessor to generate the signature of the firmware variable using the key stored in the secure non-volatile storage.

3. The apparatus of claim 2, wherein the secure non-volatile storage is included in the cryptoprocessor.

4. The apparatus of claim 3, wherein the key is a private key, wherein the private key is associated with a public key, and wherein the firmware instructions are to cause the cryptoprocessor to communicate the public key outside of the cryptoprocessor while retaining the private key within the cryptoprocessor.

5. The apparatus of claim 1, wherein the firmware variable is a Unified Extensible Firmware Interface (UEFI) variable, the firmware includes platform initialization (PI) firmware, and the cryptoprocessor is a trusted product module (TPM) implemented in at least one of firmware and hardware.

6. The apparatus of claim 1, wherein the firmware instructions are to cause the cryptoprocessor to verify the signature of the firmware variable.

7. The apparatus of claim 1, wherein the firmware instructions are to cause the cryptoprocessor to create the key within the cryptoprocessor.

8. The apparatus of claim 1, wherein the firmware instructions are to cause the cryptoprocessor to execute instructions during pre-boot operations of the apparatus.

9. The apparatus of claim 1, wherein the firmware instructions are to access the cryptoprocessor in response to a determination that the operating system is not accessing the cryptoprocessor.

10. A method comprising:
executing firmware instructions stored in at least one storage medium of a device; and
responsive to an execution of the firmware instructions:
accessing a cryptoprocessor of the device, wherein the cryptoprocessor is out-of-band with a general purpose processor of the device;
creating, by the cryptoprocessor, a firmware variable within the cryptoprocessor during runtime and after an operating system of the device has booted, wherein the firmware variable is a data object that can be accessed by both the firmware and the operating system during runtime, wherein the operating system is executed on the general purpose processor; and
generating, by the cryptoprocessor, a signature of the firmware variable, wherein the signature is based on a key.

11. The method of claim 10, further comprising, responsive to the execution of the firmware instructions:
storing the key in a secure non-volatile storage included in the cryptoprocessor; and
verifying, by the cryptoprocessor, the signature of the object.

12. The method of claim 11, wherein the key is a private key, wherein the private key is associated with a public key, wherein the method further comprises, responsive to the execution of the firmware instructions:
communicating, by the cryptoprocessor, the public key outside of the cryptoprocessor while retaining the private key within the cryptoprocessor.

13. The method of claim 10, further comprising, responsive to the execution of the firmware instructions:
creating, by the cryptoprocessor, the key within the cryptoprocessor.

14. The method of claim 10, further comprising, responsive to the execution of the firmware instructions:
causing the cryptoprocessor to execute instructions during pre-boot operations of the device.

15. The method of claim 10, further comprising:
determining whether the operating system is accessing the cryptoprocessor; and
in response to a determination that the operating system is not accessing the cryptoprocessor, accessing the cryptoprocessor by the firmware instructions.

16. At least one non-transitory storage medium having firmware instructions stored thereon, the firmware instructions executable to:
access a cryptoprocessor of a device, wherein the cryptoprocessor is out-of-band with a general purpose processor of the device;
cause the cryptoprocessor to generate a firmware variable and a key within the cryptoprocessor during runtime and after an operating system of the device has booted, wherein the firmware variable is a data object that can be accessed by both the firmware and the operating system during runtime, wherein the operating system is executed on the general purpose processor; and
cause the cryptoprocessor to generate a signature of the firmware variable using the key.

17. The at least one non-transitory storage medium of claim 16, the firmware instructions executable to:
cause the cryptoprocessor to validate the signature of the firmware variable.

18. The at least one non-transitory storage medium of claim 16, the firmware instructions executable to:
cause the cryptoprocessor to store the key in a secure non-volatile storage of the cryptoprocessor.

19. The at least one non-transitory storage medium of claim 18, wherein the key is a private key, wherein the private key is associated with a public key, wherein the firmware instructions are executable to:
cause the cryptoprocessor to communicate the public key outside of the cryptoprocessor while retaining the private key within the cryptoprocessor.

20. The at least one non-transitory storage medium of claim 16, the firmware instructions executable to:
access the cryptoprocessor in response to a determination that the operating system is not accessing the cryptoprocessor.

* * * * *